United States Patent
Kamiya et al.

(10) Patent No.: US 7,535,334 B2
(45) Date of Patent: May 19, 2009

(54) OPTICAL DEFLECTOR

(75) Inventors: Yoshitaka Kamiya, Hachioji (JP); Kenzi Murakami, Hino (JP); Daisuke Matsuo, Hachioji (JP); Yosuke Oka, Hachioji (JP)

(73) Assignee: Olympus Corporation, Tokyo (JP)

( * ) Notice: Subject to any disclaimer, the term of this patent is extended or adjusted under 35 U.S.C. 154(b) by 529 days.

(21) Appl. No.: 11/293,071

(22) Filed: Dec. 2, 2005

(65) Prior Publication Data
US 2006/0125597 A1     Jun. 15, 2006

(30) Foreign Application Priority Data
Dec. 14, 2004   (JP)  ............... 2004-361208

(51) Int. Cl.
    *H01C 10/32*     (2006.01)
(52) U.S. Cl. ...................... 338/171; 359/196
(58) Field of Classification Search ............ 338/171
See application file for complete search history.

(56) References Cited

U.S. PATENT DOCUMENTS 4,562,722 A * 1/1986 Schuele et al. ............. 73/11.01
5,086,785 A * 2/1992 Gentile et al. ............... 600/595
6,800,844 B2 * 10/2004 Kandori et al. ............. 250/234

FOREIGN PATENT DOCUMENTS

JP         5-119280       5/1993

* cited by examiner

*Primary Examiner*—Elvin G Enad
*Assistant Examiner*—Joselito Baisa
(74) *Attorney, Agent, or Firm*—Scully, Scott, Murphy & Presser, P.C.

(57) ABSTRACT

The present invention provides an optical deflector capable of reducing a temperature drift of a strain gauge due to a temperature gradient, and detecting with high accuracy an angular displacement of a mirror surface. The optical deflector includes a movable plate, two fixed portions which are disposed at an outer side of the movable plate, two elastic supporting members which are disposed to be substantially symmetric about a center line of the movable plate, and which connect the movable plate and the two fixed portions, an angular-displacement detecting portion having a Wheatston bridge as a measuring portion which includes two active resistors, and two reference resistors, and detects an angular displacement of the movable plate, and at least one resistor element is provided on the elastic supporting portion. All of the four resistor elements are in an isothermal characteristics area.

21 Claims, 12 Drawing Sheets

OPTICAL DEFLECTOR

CROSS-REFERENCE TO RELATED APPLICATION

The present application is based upon and claims the benefit of priority from the prior Japanese Patent Application No. 2004-361208 filed on Dec. 14, 2004; the entire contents of which are incorporated herein by reference.

BACKGROUND OF THE INVENTION

1. Field of the Invention

The present invention relates to an optical deflector, and in particular to an optical deflector which includes an angular-displacement detecting portion.

2. Description of the Related Art

In recent years, an optical deflector which is manufactured by using a micro machine technology in which a semiconductor manufacturing technology is applied has been drawing attention. For example, in Japanese Patent Application Laid-open Publication No. Hei 5-119280, an optical deflector which is used in a scanner of a projection display and a laser printer, has been disclosed.

FIG. 12 denotes a structure of an optical deflector disclosed in Japanese Patent Application Laid-open Publication No. Hei 5-119280. The optical deflector includes a mirror portion 9 which has a mirror surface 10 having both ends thereof supported by torsion bars 8, and electrode portions 12a and 12b which are provided on a substrate 7 facing a side of a rear surface of the mirror surface 10. There is an electrostatic-attraction force acting between the electrodes 12a and 12b, and the rear surface of the mirror surface 10. Due to the electrostatic-attraction force an angle of inclination of the mirror surface 10 is changed. Strain gauges R1, R2, R3, and R4 are formed on the torsion bars 8. A change in a resistance of the strain gauges R1, R2, R3, and R4 is measured. An angle of inclination θ of the mirror surface 10 is detected from the change in the value of resistance. A unit which controls the angle of inclination of the mirror surface controls the angle of inclination θ of the mirror surface 10 by using the detected value of the angle of inclination θ. This enables a closed loop control. As a result, harmful vibrations are eliminated and a contact of the mirror section with the electrode is reduced.

In the structure denoted in FIG. 12, the strain gauges R1 and R2 are disposed on one of the torsion bars and the strain gauges R3 and R4 are disposed on the other torsion bar. If the strain gauges which form the Wheatston bridge circuits are at positions away from each other, it is susceptible to influence of a surrounding temperature distribution. For example, a case in which there is a driving circuit near the strain gauges R1 and R2 is taken into consideration. In this case, the strain gauges R1 and R2 are susceptible to a thermal influence from the driving circuit. For this reason, a temperature drift which differs from the temperature drift in the strain gauges R3 and R4 is developed in the strain gauges R1 and R2. As a result of this, there is deterioration in accuracy of detection of an angular displacement (inclination) of the mirror surface, which is an issue.

SUMMARY OF THE INVENTION

The present invention is made in view of the abovementioned issue and it is an object of the present invention to provide an optical deflector which is capable of reducing a temperature drift of a strain gauge due to a temperature gradient and detecting with high accuracy an angular displacement of a mirror surface.

To solve the abovementioned problem and to achieve an object, according to the present invention, an optical deflector which includes a movable plate, a fixed portion disposed on an outer side of the movable plate, an elastic supporting member which is disposed substantially symmetrically about a center line of the movable plate and which connects the movable plate and the fixed portion, and an angular-displacement detecting portion which has a Wheatston bridge as a measuring portion, which includes a plurality of resistor elements and which detects the angular displacement of the movable plate, and at least one resistor element is provided to the elastic supporting member, can be provided. The optical deflector which deflects light is characterized by all the resistor elements being in an isothermal characteristics area which is an area in which all the resistor elements are at substantially the same temperature condition.

Moreover, according to a favorable aspect of the present invention, it is desirable that the isothermal characteristics area is an area near a connecting portion which connects the elastic supporting member and the fixed portion, and the resistor elements have the same layer structure.

Furthermore, according to another favorable aspect of the present invention, the resistor element includes four resistor elements which are formed on the elastic supporting member, a first resistor element and a second resistor element are formed on a same first surface and a third resistor element and a fourth resistor element are formed a same second surface. It is desirable that with the angular displacement of the movable plate, one of the first resistor element and the second resistor element is disposed at a position where the resistor element is subjected to a compressive stress and the other resistor element is disposed at a position where the resistor element is subjected to a tensile stress, and one of the third resistor element and the fourth resistor element is disposed at a position where the resistor element is subjected to the compressive stress and the other resistor element is disposed at a position where the resistor element is subjected to the tensile stress.

According to still another aspect of the present invention, it is desirable that the resistor elements include a reference element provided on the fixed portion and an active element which is provided on the elastic supporting member and whose resistance changes according to a distortion of the elastic supporting member, and both the reference element and the active element have the same layer structure.

According to still another aspect of the present invention, it is desirable that the fixed portion includes a substrate and a layer which are extended from the elastic supporting member, and the reference element is disposed in only an area of the layer that is extended.

According to still another aspect of the present invention, it is desirable that there are two active elements and one of the two active elements is disposed at a position where the active element is subjected to the compressive stress and the other active element is disposed at a position where the active element is subjected to the tensile stress.

According to still another aspect of the present invention, it is desirable that the reference element and the active elements are formed on the same surface.

According to still another aspect of the present invention, it is desirable that the optical deflector includes a GND (ground) electrode which is provided on the movable plate, a driving electrode which is provided facing the GND electrode, and one end of the resistor element and the GND electrode are electrically connected.

The optical deflector according to the present invention includes a movable plate, a fixed portion which is positioned on an outer side of the movable plate, and the elastic supporting member which is disposed substantially symmetrically about the center line of the movable plate and which connects the movable plate and the fixed portion. The angular-displacement detecting portion detects the angular displacement of the movable plate. The angular-displacement detecting portion has the Wheatston bridge as a measuring portion which includes the plurality of resistor elements. In this case, at least one resistor element is provided on the elastic supporting member. All the resistor elements are in the isothermal characteristics area which is an area in which all the resistor elements are at approximately same temperature condition. By this, all the resistor elements which are included in the Wheatston bridge are at substantially same temperature condition. Therefore, it is possible to reduce different temperature drift of each resistor element due to the temperature gradient. As a result, it is possible to provide an optical deflector which can detect accurately the angular displacement of the mirror surface.

DETAILED DESCRIPTION OF THE INVENTION

Embodiments of an optical deflector according to the present invention will be described below in detail with reference to the accompanying diagrams. However, the present invention is not restricted only to these embodiments.

FIRST EMBODIMENT

Figure 1A:
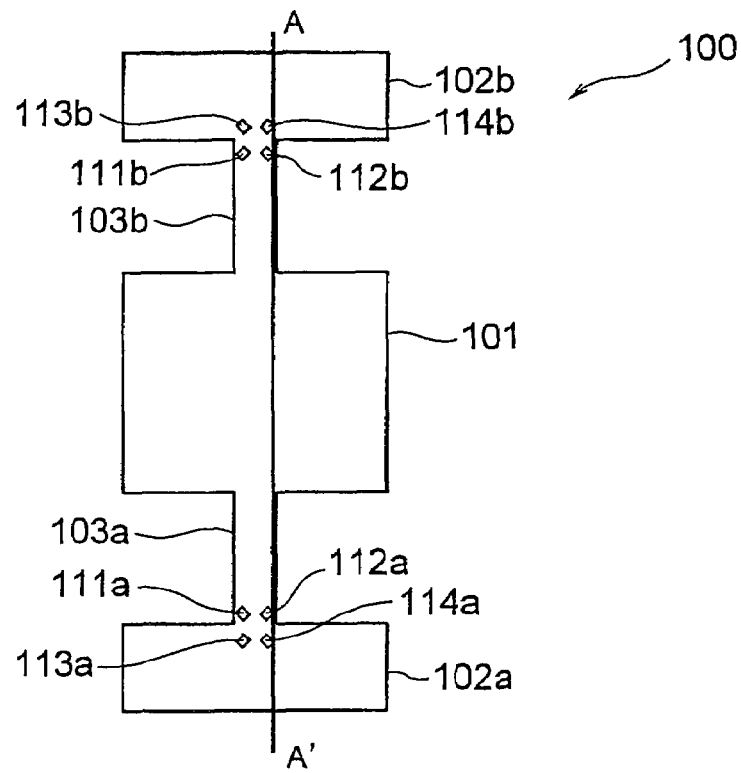
FIG. 1A is a diagram denoting a front view of an optical deflector of a first embodiment.
Figure 1B:
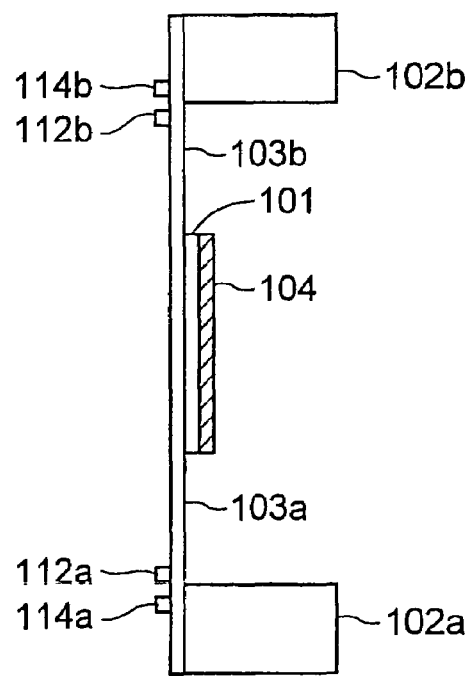
FIG. 1B is a cross-sectional view of the optical deflector of the first embodiment, taken along a line A-A'.

FIG. 1A denotes a schematic front view of an optical deflector 100 according to a first embodiment of the present invention. FIG. 1B denotes a cross-sectional view along a line A-A'. The structure is such that an elastic supporting portion 103a is extended from a fixed portion 102a. Moreover, an elastic supporting portion 103b is extended from the other fixed portion 102b. A movable plate 101 is formed on an opposite side of a side of the elastic supporting portions 103a and 103b to which the fixed portions 102a and 102b are connected. A mirror surface 104 is formed on a rear surface of the movable plate 101. The mirror surface 104 is made of a material such as aluminum.

Two active resistors 111a and 112a are formed near a portion (near a connecting portion) on the elastic supporting portion 103a where the fixed portion 102a is connected. Moreover, two reference resistors 113a and 114a are formed near a portion (near a connecting portion) on the fixed portion 102a where the elastic supporting portion 103a is connected. In this case, the active resistors are provided on the elastic supporting member and the active resistors are active elements whose resistance changes according to distortion of the elastic supporting member. The reference resistors are reference elements provided on the fixed portion. The active resistors 111a and 112a and the reference resistors 113a and 114a are disposed as near as possible to the isothermal characteristics area. The isothermal characteristics area is an area in which all the resistor elements are at a substantially same temperature condition. The isothermal characteristics area is formed near a connecting portion of the elastic supporting portion 103a and the fixed portion 102a.

Moreover, two active resistors 111b and 112b are formed near a portion (near a connecting portion) of the elastic supporting portion 103b where the fixed portion 102b is connected. Two reference resistors 113b and 114b are formed near a portion (near a connecting portion) of the fixed portion 102b where the elastic supporting portion 103b is connected. The active resistors 111b and 112b and the reference resistors 113b and 114b are disposed as near as possible to the isothermal characteristics area. The isothermal characteristics area is formed near a connecting portion of the elastic supporting portion 103b and the fixed portion 102b.

One of the active resistors 111a and 112a is disposed at a position where the active resistor is subjected to the compressive stress and the other active resistor is disposed at a position where the active resistor is subjected to the tensile stress. In other words, the two active resistors 111a and 112a are disposed such that the change in the respective resistance is reverse for the two active resistors.

Similarly, one of the active resistors 111b and 112b is disposed at a position where the active resistor is subjected to the compressive stress and the other active resistor is disposed at a position where the active resistor is subjected to the tensile stress. In other words, the two active resistors 111b and 112b are disposed such that the change in the respective resistance is reverse for the two active resistors.

The fixed portions 102a and 102b are formed of a material such as silicon substrate. The movable plate 101 is formed of a thin plate of silicon which is obtained by processing the silicon substrate. The elastic supporting portions 103a and 103b are formed by a semiconductor manufacturing process by using a thin film of silicon or a thin film of polyimide.

Figure 3A:
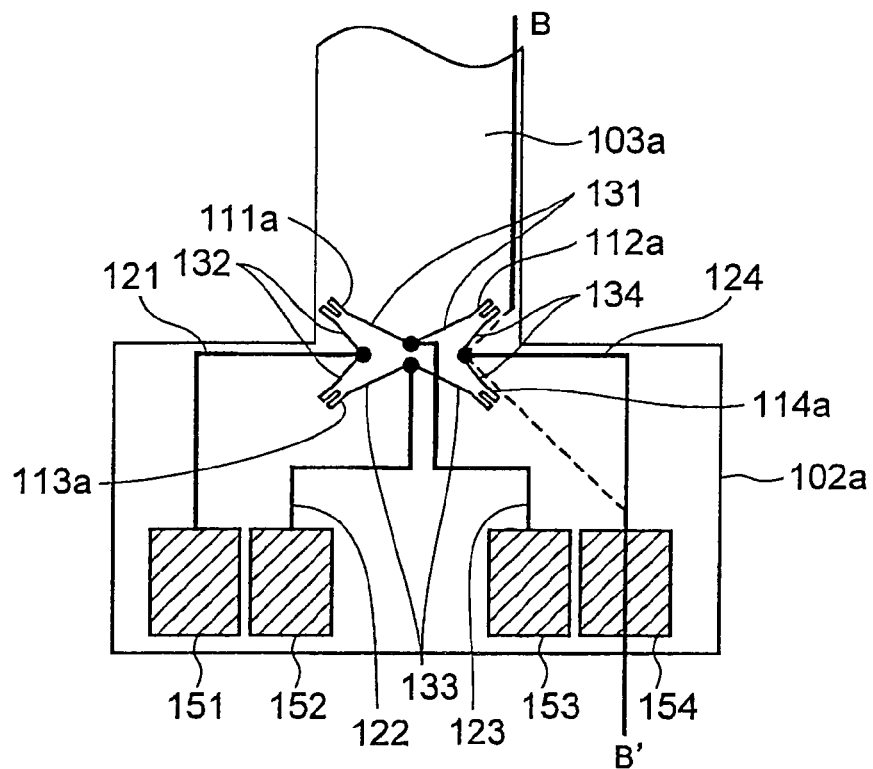
FIG. 3A is a diagram denoting a structure near a fixed portion of the optical deflector of the first embodiment.

Next, a structure of wiring of the optical deflector 100 will be described. FIG. 3A is an enlarged view of an area surrounding the fixed portion 102a on an elastic supporting portion 103a side. The active resistors 111a and 112a are electrically connected by a wire 131. The reference resistors 113a and 114a are electrically connected by a wire 133. The active resistor 111a and the reference resistor 113a are electrically connected by a wire 132. The active resistor 112a and the reference resistor 114a are electrically connected by a wire 134.

Four electrode pads 151, 152, 153, and 154 are formed on the fixed portion 102a. An extracted wire 121 electrically connects the electrode pad 151 and an approximately a middle portion of the wire 132. Moreover, an extracted wire 124 electrically connects the electrode pad 154 and an approximately middle portion of the wire 134. Further, an extracted wire 122 electrically connects the electrode pad 152 and an approximately a middle portion of the wire 133. Similarly, an extracted wire 123 connects electrically the electrode pad 153 and an approximately a middle portion of the wire 131.

Figure 3B:
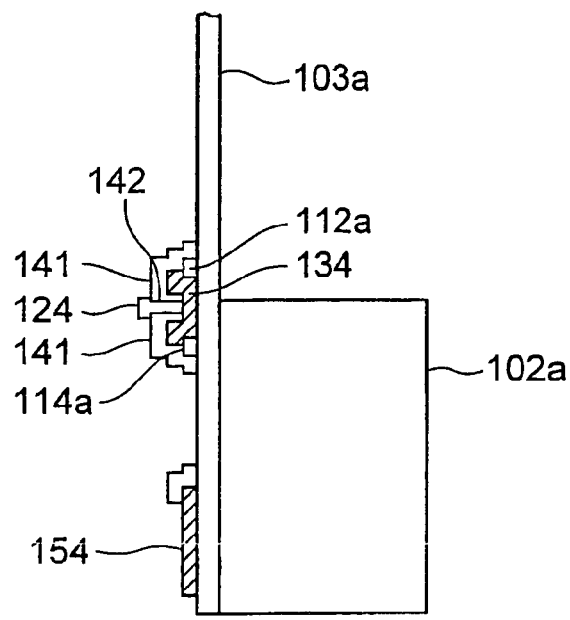
FIG. 3B is a diagram denoting a cross-sectional view of the optical deflector of the first embodiment, taken along a line B-B'.

FIG. 3B is a diagram denoting a cross-sectional view of FIG. 3A, taken along a line B-B'. A member having a layer structure same as a layer structure extended from the elastic supporting portion 103a is formed on the fixed portion 102a. The electrode pad 154, the reference resistor 114a, and a part of the wire 134 is formed on a layer structure which is same as the elastic supporting portion 103a. The reference resistor 114a and the wire 134 are electrically connected. Moreover, the active resistor 112a and a part of the wire 134 is formed on the elastic supporting portion 103a. The active resistor 112a and the wire 134 are electrically connected. An insulating film 141 is formed on the active resistor 112a, the wire 134, and the reference resistor 114a. The extracted wire 124 is formed on the insulating film 141. A contact hole 142 is provided in a part of the insulating film 141. The wire 134 and the extracted wire 124 are electrically connected through the contact hole 142. A side of the active resistor 111a and the reference resistor 113a, and a side of the elastic supporting portion 103b which are not shown in the diagram also have the similar structures.

The wires 131, 132, 133, and 134, the extracted wires 121, 122, 123, and 124, and the electrode pads 151, 152, 153, and 154 are made of a material such as aluminum by the semiconductor manufacturing process. The insulating film 141 is made of a material such as oxide silicon by the semiconductor manufacturing process. The active resistors 111a, 112a, 111b, and 112b, and the reference resistors 113a, 114a, 113b, and 114b are formed integrally by a semiconductor manufacturing process by using a material such as titanium.

Figure 4:
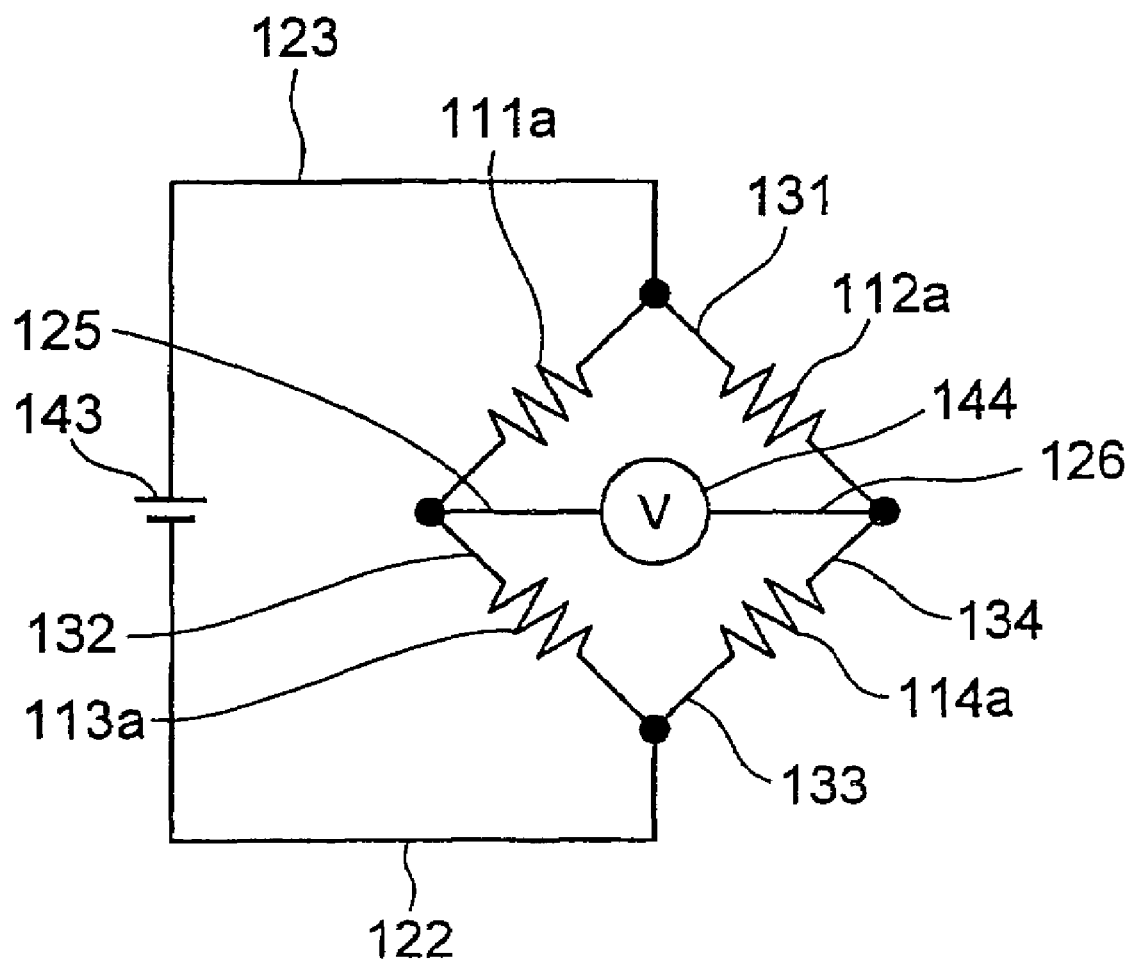
FIG. 4 is a diagram denoting a circuit structure of the optical deflector of the first embodiment.

FIG. 4 is a diagram denoting a circuit for detecting an angular displacement of the movable plate 101 on the side of the elastic supporting portion 103a. The Wheatston bridge includes the active resistors 111a and 112a provided on the elastic supporting portion 103a, the reference resistors 113a and 114a provided on the fixed portion 102, and the wires 131, 132, 133, and 134. A power supply 143 creates an electric potential difference between the wires 131 and 133 of the Wheatston bridge (between the electrode pad 152 and the electrode pad 153 in FIG. 3A.) A detector 144 is connected between the wire 132 and the wire 134 (between the electrode pad 151 and the electrode pad 154 in FIG. 3A) via wires 125 and 126 respectively. The detector 144 detects voltage. When there is no displacement of the movable plate 101, a voltage detected by the detector 144 is 0 V. Whereas, when the movable plate 101 is displaced, there is a change in the voltage detected by the detector 144, in accordance with an angular displacement. The voltage change is converted into an angle. Moreover, Wheatston bridge on the side of the elastic supporting portion 103b also is structured similarly.

Figure 2A:
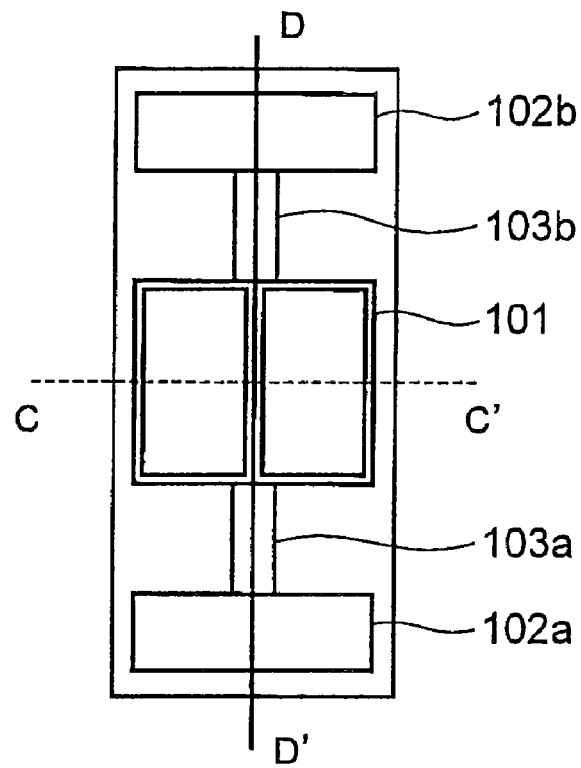
FIG. 2A is a diagram denoting a rear view of the optical deflector of the first embodiment.
Figure 2B:
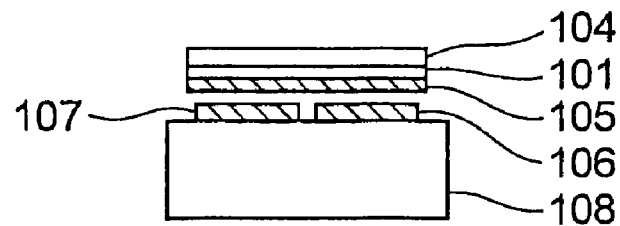
FIG. 2B is a diagram denoting a cross-sectional view of the optical deflector of the first embodiment, taken along a line C-C'.

FIG. 2B is an example of a structure for driving the movable plate 101 and denotes a structure in a case of an electrostatic drive for example. FIG. 2A denotes a front view of a structure (a view as seen from a rear surface of FIG. 1A) for driving the movable plate 101. Moreover, FIG. 2B denotes a cross-sectional view taken along a line C-C' in FIG. 2A. A GND electrode 105 is formed on a surface on an opposite side of the mirror surface 104 of the movable plate 101. Two opposed electrodes 107 and 106 are formed on an opposed substrate 108. The GND electrode 105 and the opposed electrodes 107 and 106 are disposed facing one another with a predetermined gap. Moreover, the structure is such that a center line between the two opposed electrodes 106 and 107 overlaps substantially with a pivot axis D-D' of the movable plate 101. Here, the 'pivot' means a repeated reciprocating motion around one predetermined virtual axis. However, it is not restricted to the repeated reciprocating motion around one predetermined virtual axis and also includes just an inclination around one predetermined virtual axis. For example, the fluctuation of movable plate means that the movable plate is inclined around an axis and performs the repeated reciprocating motion. Moreover, the 'pivot axis' means the one predetermined virtual axis mentioned above.

The movable plate 101 is driven by an electrostatic-attraction force. In FIG. 2B for example, when a voltage is applied between the opposed electrode 107 and the GND electrode 105, a left-side portion of the movable plate 101 is attracted toward the opposed electrode 107. Moreover, a right-side portion of the movable plate 101 is displaced in a direction away from the opposed electrode 106. Therefore, the movable plate 101 fluctuates around the pivot axis D-D' in FIG. 2A.

Next, an effect of an embodiment of the present invention will be described below. The movable plate 101 is supported by the elastic supporting portions 103a and 103b. As mentioned above, the structure is such that the movable plate 101 can fluctuate one-dimensionally with an axis (the pivot axis D-D') connecting the elastic supporting portions 103a and 103b as a center. When a voltage is applied to the GND electrode 105 provided on the movable plate 101 and to one of the opposed electrodes 107 and 106 provided on the opposed substrate 108, an electrostatic-attraction force is developed in the GND electrode 105 and one of the opposed electrodes 107 and 106. Due to the electrostatic-attraction force, the movable plate 101 is displaced such that an incident light is deflected to the mirror surface 104. When the movable plate is displaced, the elastic supporting portions 103a and 103b are twisted. Because of the twisting, the elastic supporting portions 103a and 103b are distorted. At the same time, the active resistors 111a, 112a, 111b, and 112b provided near a fixed end on the elastic supporting portions 103a and 103b are also distorted. Due to the distortion, there is a change in a gauge resistance of the active resistors 111a, 112a, 111b, and 112b.

An amount of change in the gauge resistance is detected as a voltage by the detector 144 provided in the Wheatston bridge on the side of the elastic supporting portion 103a. The Wheatston bridge in this case, includes the active resistors 111a and 112a, and the reference resistors 113a and 114a provided near the elastic supporting portion 103a on the fixed portion 102a. The voltage detected is converted into an angle to obtain an amount of angular displacement (deflection angle).

The side of the elastic supporting portion 103b has a structure similar to the structure of the side of the elastic supporting portion 103a. In other words, a detector (not shown in the diagram) provided in the Wheatston bridge on the side of the elastic supporting portion 103b detects the amount of change in the gauge resistance as a voltage. The Wheatston bridge in this case, includes the active resistors 111b, and 112b, and the reference resistors 113b and 114b provided near the elastic supporting portion 103b on the fixed portion 102b. The voltage detected is converted into an angle to obtain the amount of angular displacement (deflection angle).

Here, the active resistors 111a and 112a, and the reference resistors 113a and 114a are disposed in the isothermal characteristics area. Moreover, the active resistors 111b and 112b, and the reference resistors 113b and 114b are disposed in the isothermal characteristics area. Therefore, the external temperature gradient for the four resistor elements of the Wheatston bridge, such as an effect of heat generated by an electric substrate, and an effect of heat flow due to the fluctuation of the movable plate can be reduced.

It is desirable that the resistor elements 111a, 111b, 112a, 112b, 113a, 113b, 114a, and 114b are formed integrally. By forming the resistor elements integrally, non-uniformity (variation) in the shape of each of the resistor elements can be reduced.

As mentioned above, the two active resistors 111a and 112a are disposed such that the change in the respective resistance is reverse for the two active resistors. By disposing the two active resistors in such manner, according to the distortion of the elastic supporting portion 103a, one of the active resistors 111a and 112a is subjected to the compressive stress and the other active resistor is subjected to the tensile stress. Similarly, the active resistors 111b and 112b are disposed such that the change in the respective resistance is reverse for the two active resistors. By disposing the two active resistors in this manner, according to the distortion of the elastic supporting portion 103b, one of the active resistors 111b and 112b is subjected to the compressive stress and the other active resistance is subjected to the tensile stress. As a result, the sensitivity of detection of change in the angle is doubled.

Thus, as described above, according to the first embodiment, it is possible to provide the optical deflector 100 which is capable of detecting with high accuracy the angular displacement of the mirror surface 104 (movable plate 101) by reducing substantially the effect of the temperature gradient and the heat flow. Moreover, the resistor elements can be integrated. For example, the active resistors 111a and 112a and the reference resistors 113a and 114a can be manufactured in one and the same manufacturing process. Accordingly, each of the resistor elements can be formed to have substantially uniform shape, i.e. film thickness and width etc. Therefore, non-uniformity (variation) in the shape of each of the resistor elements can be reduced. As a result, the Wheatston bridge can be balanced. Due to the reverse change in the resistance of the two active resistors provided on one elastic supporting portion, the sensitivity of detection is doubled. In the first embodiment, a case of the electrostatic drive is described as an example. However, it is not necessary to restrict to the electrostatic drive and a magnetic drive may also be used as a driving method.

SECOND EMBODIMENT

Figure 5A:
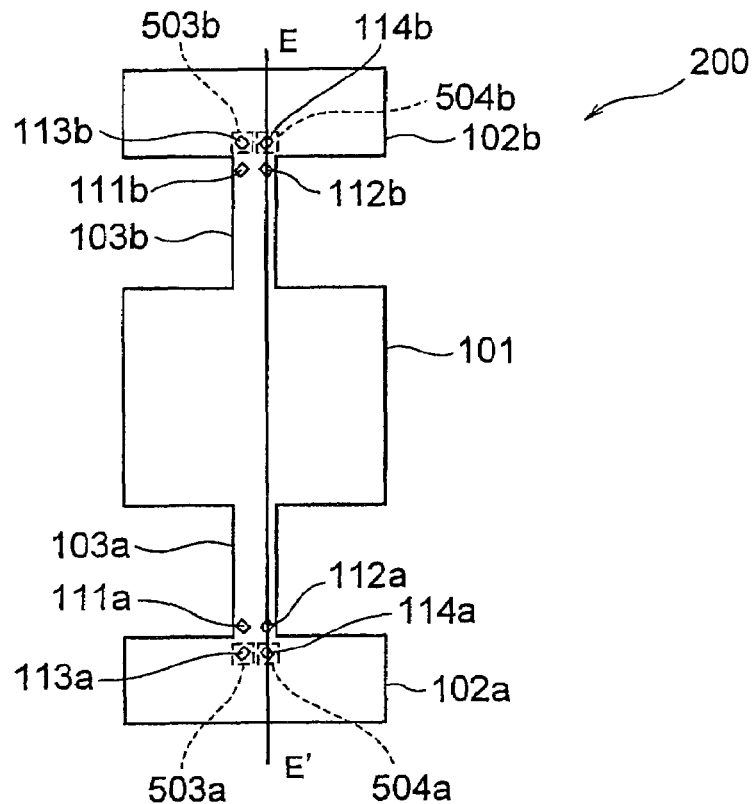
FIG. 5A is a diagram denoting a front view of an optical deflector of a second embodiment.
Figure 5B:
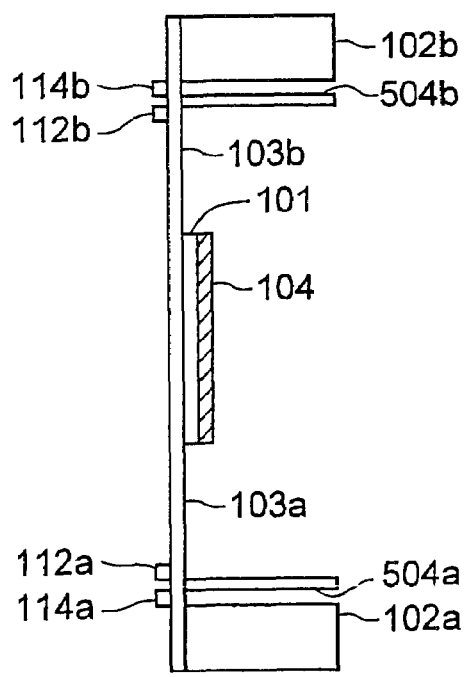
FIG. 5B is a cross-sectional view of the optical deflector of the second embodiment, taken along a line E-E'.

FIG. 5A denotes a schematic front view of an optical deflector 200 according to a second embodiment of the present invention. FIG. 5B denotes a cross-sectional view of FIG. 5A taken along a line E-E'. Same reference numerals are used for portions identical with the portions in the first embodiment.

The two elastic supporting portions 103a and 103b are extended from the fixed portions 102a and 102b respectively. The movable plate 101 is formed on the opposite side of the side of the elastic supporting portions 103a and 103b to which the fixed portions 102a and 102b are connected. The mirror surface 104 is formed on the rear surface of the movable plate 101. The mirror surface 104 is made of a material such as aluminum.

The two active resistors 111a and 112a are formed near the portion (near the connecting portion) of the elastic supporting portion 103a where the fixed portion 102a is connected. Moreover, the two reference resistors 113a and 114a are formed near the portion (near the connecting portion) of the fixed portion 102a where the elastic supporting portion 103a is connected. The active resistors 111a and 112a, and the reference resistors 113a and 114a are disposed as near as possible to the isothermal characteristics area. The active resistors 111a and 112a, the reference resistors 113a and 114a, and a wiring (not shown in the diagram) form a Wheatston bridge.

Moreover, the two active resistors 111b and 112b are formed near the portion (near the connecting portion) on the elastic supporting portion 103b where the fixed portion 102b is connected. The two reference resistors 113b and 114b are formed near the portion (near the connecting portion) on the fixed portion 102b where the elastic supporting portion 103b is connected. The active resistors 111b and 112b and the reference resistors 113b and 114b are disposed as near as possible to the isothermal characteristics area. The active resistors 111b and 112b, the reference resistors 113b and 114b, and a wiring (not shown in the diagram) form one Wheatston bridge.

One of the active resistors 111a and 112a is disposed at a position where the active resistor is subjected to the compressive stress and the other active resistor is disposed at a position where the active resistor is subjected to the tensile stress. In other words, the two active resistors 111a and 112a are disposed such that the change in the respective resistance is reverse for the two active resistors.

Similarly, one of the active resistors 111b and 112b is disposed at a position where the active resistor is subjected to the compressive stress and the other active resistor is disposed at a position where the active resistor is subjected to the tensile stress. In other words; the two active resistors 111b and 112b are disposed such that the change in the respective resistance is reverse for the two active resistors.

Through holes 503a and 504a are provided in the fixed portion 102a under the reference resistors 113a and 114a. The fixed portion 102a includes a substrate and a layer which are extended from the elastic supporting portion 103a. The substrate around the reference resistor 114a is removed due to the through hole 504a. In other words, the reference resistor 114a is disposed only in an area of the layer which is extended from the elastic supporting portion 103a. The other reference resistor 113a has the same structure as the reference resistor 114a. Therefore, the layer structure of the active resistors 111a and 112a and the layer structure of the reference resistors 113a and 114a are substantially similar.

Moreover, through holes 503b and 504b are provided in the fixed portion 102b under the reference resistors 113b and 114b. Due to this, the reference resistors 113b and 114b are disposed only in an area of the layer which is extended from the elastic supporting portion 103b. Therefore, the layer structure of the active resistors 111b and 112b and the layer structure of the reference resistors 113b and 114b are substantially similar.

The fixed portions 102a and 102b are formed of a material such as silicon substrate. The movable plate 101 is formed of a material such as a thin plate of silicon which can be obtained by processing the silicon substrate. The elastic supporting portions 103a and 103b are formed by the semiconductor manufacturing process by using a thin film of silicon or a thin film of polyimide. The active resistors and the reference resistors are formed integrally by the semiconductor manufacturing process by using a material such as titanium. The structure and the operation of the electrical wiring being similar to the structure and the operation described in the first embodiment, the description thereof is omitted.

In the second embodiment, the active resistors 111a and 112a, and the reference resistors 113a and 114a in the Wheatston bridge can be structured to have substantially similar layer structure. Moreover, the active resistors 111b and 112b, and the reference resistors 113b and 114b in the other Wheatston bridge can be structured to have substantially similar layer structure. Due to this, it is possible to maintain the same thermal conduction and heat release. As a result, it is possible to provide the optical deflector 200 which is capable of detecting with high accuracy the angular displacement of the mirror surface 104 (movable plate 101) by reducing substantially the effect of the temperature gradient and the heat flow.

THIRD EMBODIMENT

Figure 6A:
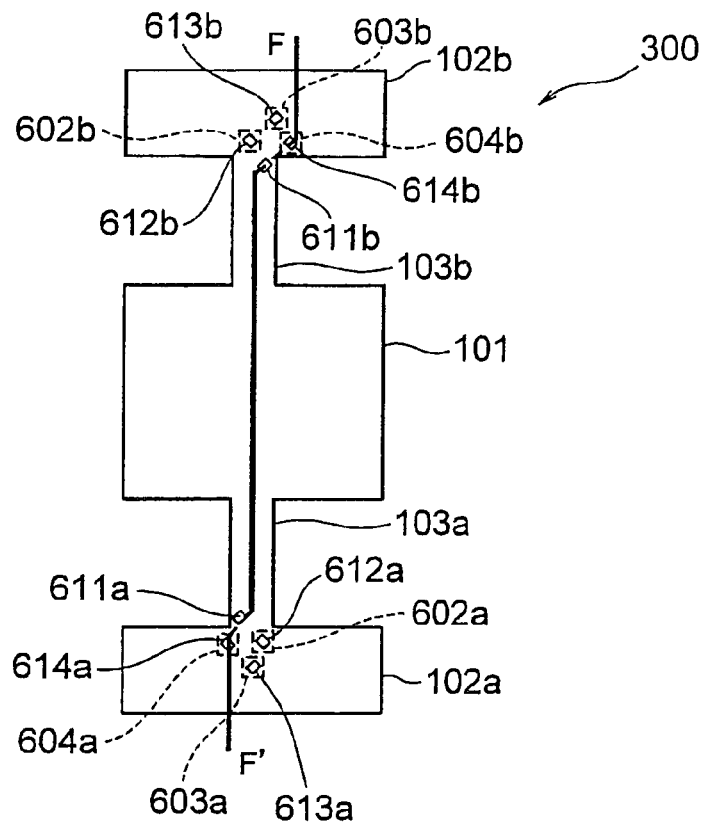
FIG. 6A is a diagram denoting a front view of an optical deflector of a third embodiment.
Figure 6B:
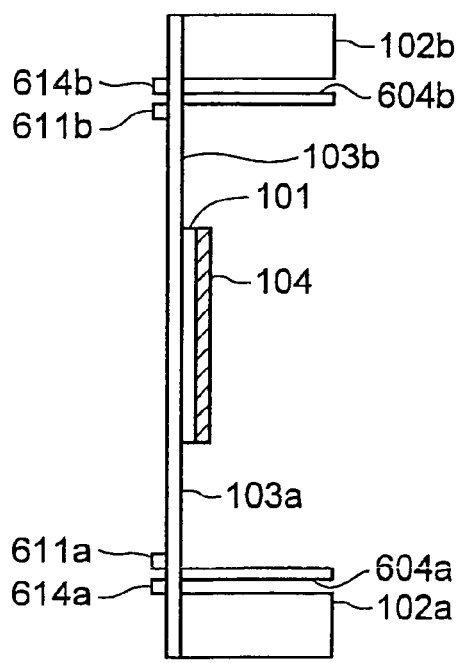
FIG. 6B is a cross-sectional view of the optical deflector of the third embodiment, taken along a line F-F'.

FIG. 6A denotes a schematic front view of an optical deflector 300 according to a third embodiment of the present invention. FIG. 6B denotes a cross-sectional view taken along a line F-F' in FIG. 6A. Same reference numerals are used for portions identical with the portions in the first embodiment.

The two elastic supporting portions 103a and 103b are extended from the fixed portions 102a and 102b respectively. The movable plate 101 is formed on the opposite side of the side of the elastic supporting portions 103a and 103b to which the fixed portions 102a and 102b are connected. The mirror surface 104 is formed on the rear surface of the movable plate 101. The mirror surface 104 is made of a material such as aluminum.

An active resistor 611a is formed near a portion (near the connecting portion) on the elastic supporting portion 103 where the fixed portion 102a is connected. Moreover, three reference resistors 612a, 613a, and 614a are formed near the portion (near the connecting portion) on the fixed portion 102a where the elastic supporting portion 103a is connected. The active resistor 611a and the reference resistors 612a, 613a, and 614a are disposed as near as possible to the isothermal characteristics area. The active resistor 611a, the reference resistors 612a, 613a, and 614a, and a wiring (not shown in the diagram) form a Wheatston bridge.

An active resistor 611b is formed near the portion (near the connecting portion) on the elastic supporting portion 103b where the fixed portion 102b is connected. Three reference resistors 612b, 613b, and 614b are formed near the portion (near the connecting portion) on the fixed portion 102b where the elastic supporting portion 103b is connected. The active resistor 611b, and the reference resistors 612b, 613b, and 614b are disposed as near as possible to the isothermal characteristics area. The active resistors 611b, the reference resistors 612b, 613b, and 614b, and a wiring (not shown in the diagram) form a Wheatston bridge.

Through holes 602a, 603a, and 604a are provided in the fixed portion 102a under the reference resistors 612a, 613a, and 614a respectively. As shown in FIG. 6B, the fixed portion 102a includes the substrate and the layer which are extended from the elastic supporting portion 103a. The substrate around the reference resistor 614a is removed due to the through hole 604a. In other words, the reference resistor 614a is disposed only in the area of the layer which is extended from the elastic supporting portion 103a. The other reference resistors 612a and 613a has the same structure as the reference resistor 614a. Therefore, the layer structure of the active resistor 611a and the layer structure of the reference resistors 612a, 613a, and 614a are substantially similar.

Moreover, through holes 602b, 603b, and 604b are provided in the fixed portion 102b under the reference resistors 612b, 613b, and 614b respectively. Due to these through holes, the reference resistors 612b, 613b, and 614b are disposed only in the area of the layer which is extended from the elastic supporting portion 103b. Therefore, the layer structure of the active resistor 611b and the layer structure of the reference resistors 612b, 613b, and 614b are substantially similar.

The fixed portions 102a and 102b are formed of a material such as silicon substrate. The movable plate 101 is formed by a thin plate of silicon which is obtained by processing the silicon substrate. The elastic supporting portions 103a and 103b are formed by a semiconductor manufacturing process by using a thin film of silicon or a thin film of polyimide. The active resistors and the reference resistors are formed integrally by a semiconductor manufacturing process by using a material such as titanium. The structure and the operation of the electrical wiring are similar to the structure and the operation described in the first embodiment.

In the third embodiment, the active resistor 611a and the reference resistors 612a, 613a, and 614a in the Wheatston bridge can be structured to have substantially similar layer structure. Moreover, the active resistor 612b and the reference resistors 612b, 613b, and 614b in the other Wheatston bridge can be structured to have substantially similar layer structure. Due to this, it is possible to maintain the same thermal conduction and heat release. As a result, it is possible to provide the optical deflector 300 which is capable of detecting with high accuracy the angular displacement of the mirror surface 104 (movable plate 101) by reducing substantially the effect of the temperature gradient and the heat flow.

FOURTH EMBODIMENT

Figure 7A:
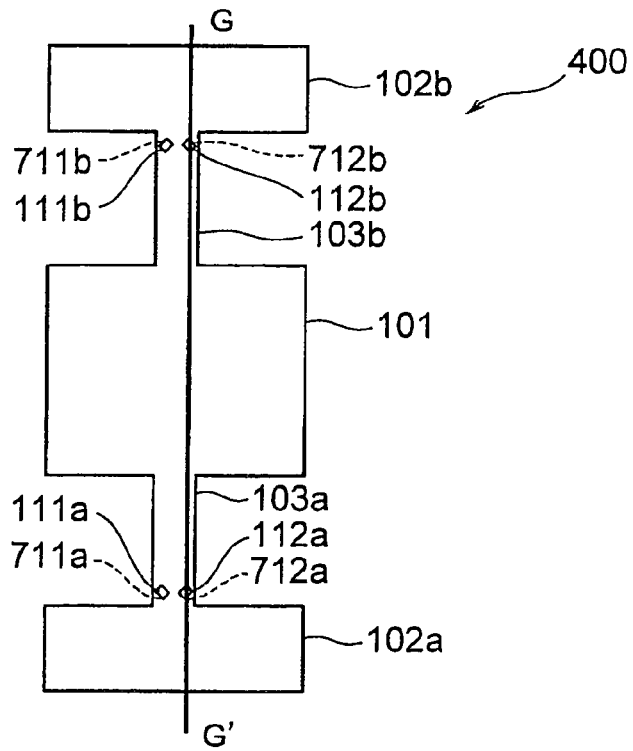
FIG. 7A is a diagram denoting a front view of an optical deflector of a fourth embodiment.
Figure 7B:
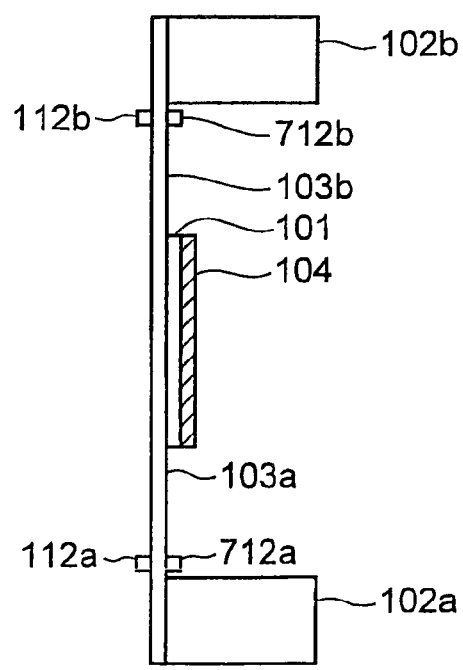
FIG. 7B is across-sectional view of the optical deflector of the fourth embodiment, taken along a line G-G'.

FIG. 7A denotes a schematic front view of an optical deflector according to a fourth embodiment of the present invention. FIG. 7B denotes a cross-sectional view taken along a line G-G' in FIG. 7A. Same reference numerals are used for portions identical with the portions in the first embodiment.

The two elastic supporting portions 103a and 103b are extended from the fixed portions 102a and 102b respectively. The movable plate 101 is formed on the opposite side of the side of the elastic supporting portions 103a and 103b to which the fixed portions 102a and 102b are connected. The mirror surface 104 is formed on the rear surface of the movable plate 101. The mirror surface 104 is made of a material such as aluminum.

The two active resistors 111a and 112a are formed near the front surface side of the elastic supporting portion 103a where the fixed portion 102a is connected. Moreover, two active resistors 711a and 712a are formed near a rear surface side of the elastic supporting portion 103a where the two fixed portions 102a are connected. As viewed from a front surface side of the optical deflector 400, the active resistor 111a and the active resistor 711a are provided at approximately the same position. Similarly, as viewed from the front surface side of the optical deflector 400, the active resistor 112a and the active resistor 712a are provided at approximately the same position.

The active resistors 111a, 112a, 711a, and 712a are disposed as near as possible to the isothermal characteristics area. The active resistors 111a, 112a, 711a, and 712a, and a wiring (not shown in the diagram) form a Wheatston bridge.

Similarly, two active resistors 111b and 112b are formed near the front surface side of the elastic supporting portion 103b where the fixed portion 102 is connected. Moreover, two active resistors 711b and 712b are formed near the rear surface side of the elastic supporting portion 103b where the fixed portion 102b is connected. As viewed from the front surface side of the optical deflector 400, the active resistor 111b and the active resistor 711b are provided at approximately the same position. Similarly, as viewed from the front surface side of the optical deflector 400, the active resistor 112b and the active resistor 712b are provided at approximately the same position.

The active resistors 111b, 112b, 711b, and 712b are disposed as near as possible to the isothermal characteristics area. The active resistors 111b, 112b, 711b, and 712b and a wiring (not shown in the diagram) form a Wheatston bridge.

One of the active resistors 111a and 112a on the front surface side is disposed at a position where the resistor is subjected to the compressive stress and the other resistor is disposed at a position where the resistor is subjected to the tensile stress. In other words, the two active resistors 111a and 112a are disposed such that the change in the respective resistance is reverse for the two active resistors. Moreover, one of the active resistors 711a and 712a on the rear surface side is disposed at a position where the active resistor is subjected to the compressive stress and the other active resistor is disposed at a position where the active resistor is subjected to the tensile stress.

Similarly, one of the active resistors 111b and 112b on the front surface side is disposed at a position where the active resistor is subjected to the compressive stress and the other active resistor is disposed at a position where the active resistor is subjected to the tensile stress. In other words, the two active resistors 111b and 112b are disposed such that the change in the respective resistance is reverse for the two active resistors. Moreover, one of the active resistors 711b and 712b on rear surface side is disposed at a position where the active resistor is subjected to the compressive stress and the other active resistor is disposed at a position where the active resistor is subjected to the tensile stress.

The fixed portions 102a and 102b are formed of a material such as silicon substrate. The movable plate 101 is formed of a thin plate of silicon which is obtained by processing the silicon substrate. The elastic supporting portions 103a and 103b are formed by a semiconductor manufacturing process by using a thin film of silicon or a thin film of polyimide. Moreover, the active resistors are formed by a semiconductor manufacturing process by using a material such as titanium.

Figure 8:
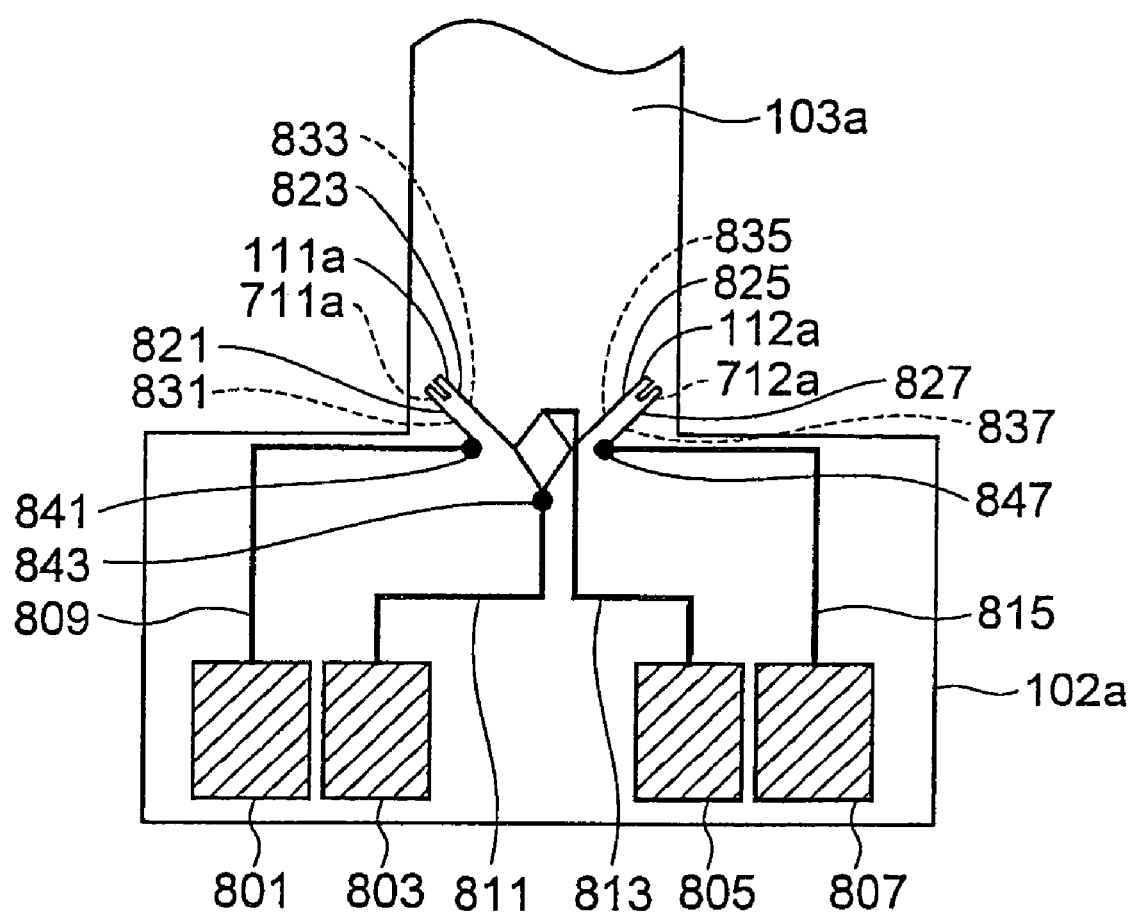
FIG. 8 is a diagram denoting a structure near the fixed portion of the optical deflector of the fourth embodiment.
Figure 9:
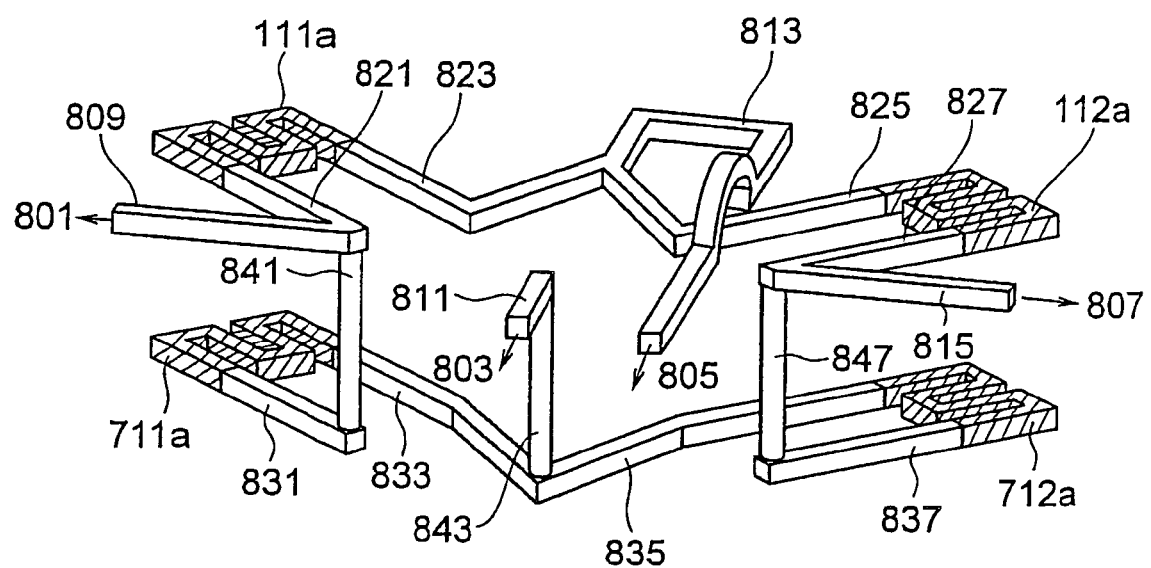
FIG. 9 is a diagram denoting a three-dimensional structure of a circuit of the optical deflector of the fourth embodiment.

Next, a wiring structure of the fourth embodiment will be described. FIG. 8 denotes an enlarged view of a portion of the elastic supporting portion 103a in FIG. 7A on which the active resistors are formed. FIG. 9 denotes three-dimensionally the wiring structure of the fourth embodiment.

The active resistor 111a and the active resistor 112a are electrically connected by an upper wire 823 and an upper wire 825. An extracted wire 813 is electrically connected to any one of the upper wire 823 and the upper wire 825 at an approximate middle portion of the combined length of the upper wire 823 and the upper wire 825. The extracted wire 813 passes over the upper side of the upper wire 825 while being insulated, and is electrically connected to an electrode pad 805.

The active resistor 111a and the active resistor 711a are electrically connected by an upper wire 821, a vertical wire 841, and a lower wire 831. An extracted wire 809 is electrically connected to any one of the upper wire 821 and the vertical wire 841 at an approximate middle portion of the combined length of the upper wire 821, the vertical wire 841, and the lower wire 831. The extracted wire 809 is electrically connected to an electrode pad 801.

The active resistor 112a and the active resistor 712a are electrically connected by an upper wire 827, a lower wire 837, and a vertical wire 847. An extracted wire 815 is electrically connected to any one of the upper wire 827 and the vertical wire 847 at an approximate middle portion of the combined length of the upper wire 827, the lower wire 837, and the vertical wire 847. The extracted wire 815 is electrically connected to an electric pad 807.

The active resistors 711a and the active resistor 712a are electrically connected by a lower wire 833 and a lower wire 835. A vertical wire 843 is electrically connected to any one of the lower wire 833 and the lower wire 835 at an approximate middle portion of the combined length of the lower wire 833 and the lower wire 835. An extracted wire 811 is electrically connected to an electrode pad 803.

In the abovementioned structure, the active resistor 111a corresponds with a first resistor element. The active resistor 112a corresponds with a second resistor element. The active resistor 711a corresponds with a third resistor element. The active resistor 712a corresponds with a fourth resistor element. As mentioned above, the active resistor 111a and the active resistor 112a are formed on the front surface (same first surface) of elastic supporting portion 103a. The active resistor 711a and the active resistor 712a are formed on the rear surface (same second surface) of the elastic supporting portion 103a.

The side of the elastic supporting portion 103b which is not shown in the diagram has a structure similar to the elastic supporting portion 103a described above. The wires such as the extracted wire, the vertical wire, and the electrode pad are formed by a semiconductor manufacturing process by using a material such as aluminum.

Figure 10:
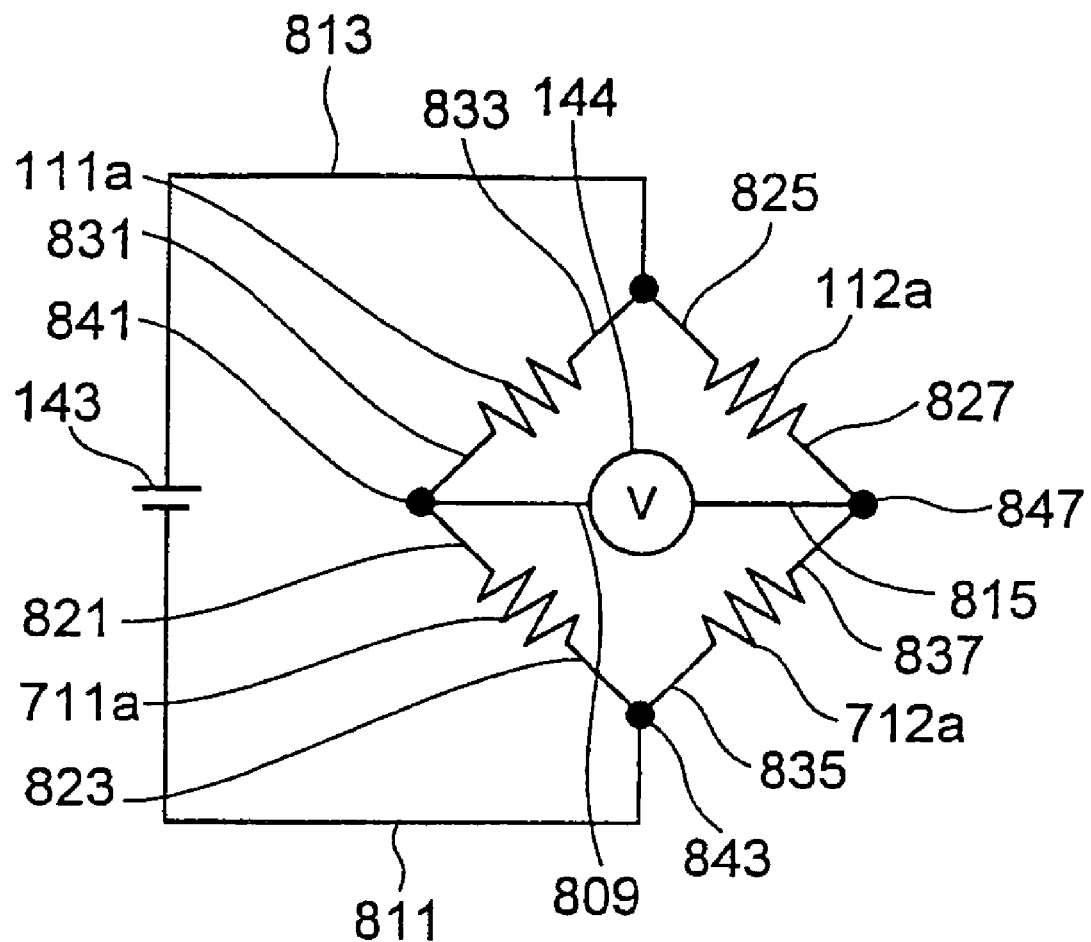
FIG. 10 is a diagram denoting a circuit structure of the optical deflector of the fourth embodiment.

FIG. 10 denotes a structure of a circuit for detecting an angular displacement (deflection angle) of the movable plate 101 on the side of the elastic supporting portion 103a. The active resistors 111a, 112a, 711a, and 712a provided on the elastic supporting portion 103a, the upper wires 821, 823, 825 and 827, the vertical wires 841, 843, and 847, and the lower wires 831, 833, and 835 and 837 form a Wheatston bridge.

The power supply 143 creates an electric potential difference between the extracted wire 811 and 813 (between the electrode pad 803 and the electrode pad 805 in FIG. 8) of the Wheatston bridge. The detector 144 is connected between the extracted wires 809 and 815 (the electrode pad 801 and the electrode pad 807 in FIG. 8). The detector 144 detects a voltage. When there is no displacement of the movable plate 101, the voltage detected by the detector 144 is 0 V. Whereas, when the movable plate 101 is displaced, there is a change in the voltage detected by the detector 144, in accordance with an angular displacement. At this time, the change in the resistance of the active resistor 111a and the active resistor 112a becomes reverse. Moreover, the change in the resistance of the active resistor 711a and the active resistor 712a also becomes reverse. The change in the resistance is converted into an amount of angular displacement. The side of the elastic supporting portion 103b which is not shown in the diagram has a structure similar to the structure of the side of the elastic supporting portion 103a.

In the fourth embodiment, as described above, the four resistor elements, for example the active resistances 111a, 112a, 711a, and 712a are divided into two layers and are disposed such that the change in the resistance in the respective layers is reverse. As a result, the sensitivity of detection can be improved four times.

FIFTH EMBODIMENT

Figure 11:
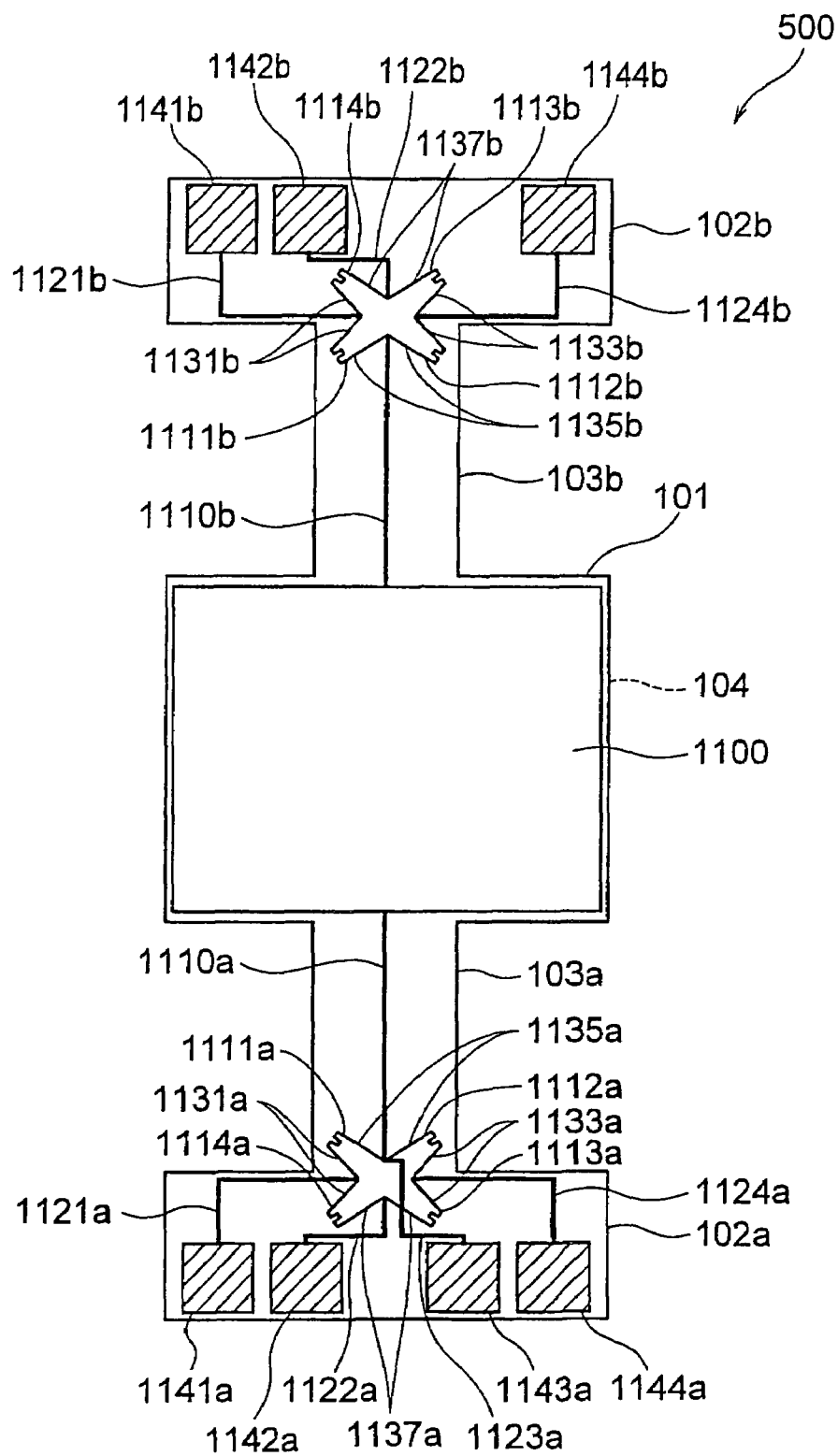
FIG. 11 is a diagram denoting a front view of an optical deflector of a fifth embodiment.
Figure 12:
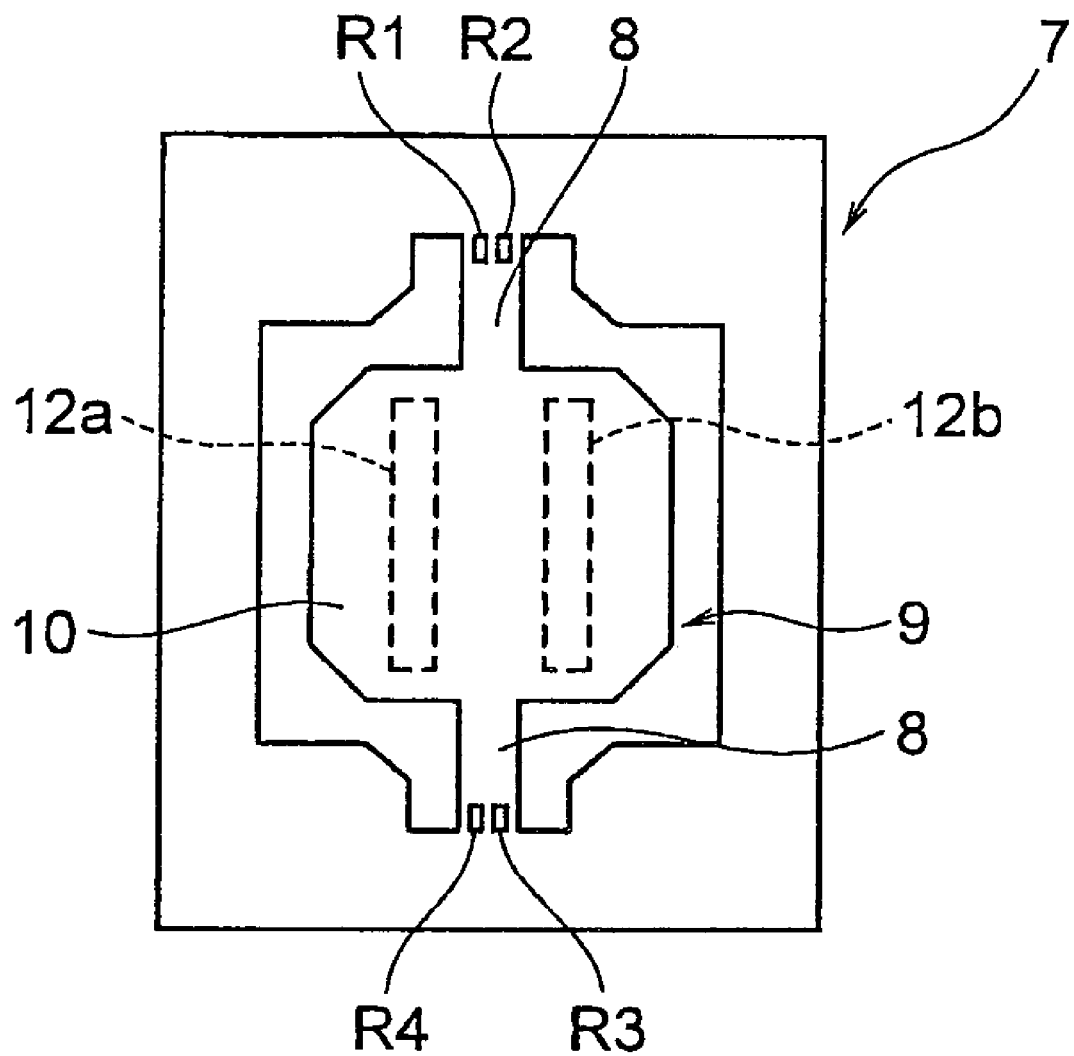
FIG. 12 is a diagram denoting a conventional optical deflector.

FIG. 11 denotes a schematic front view of an optical deflector 500 according to a fifth embodiment of the present invention. In the fifth embodiment, an electrostatic drive is used as a driving system for the movable plate 101. Same reference numerals are used for portions identical with the portions in the first embodiment.

The two elastic supporting portions 103a and 103b are extended from the fixed portions 102a and 102b. The movable plate 101 is formed on the opposite side of the side of the elastic supporting portions 103a and 103b to which the fixed portions 102a and 102b are connected. Moreover, active resistors 1111a and 1112a and active resistors 1111b and 1112b, two each, are formed near portions of the two active resistors 103a and 103b to which the fixed portions 102a and 102b are connected. Furthermore, reference resistors 1113a and 1114a and reference resistors 1113b and 1114b, two each, are formed near portions of the two fixed portions 102a and 102b to which the elastic supporting portions 103a and 103b are connected.

The active resistors 1111a and 1112a and the reference resistors 1113a and 1114a are disposed as near as possible to the isothermal characteristics area. Similarly, the active resistors 1111b and 1112b and the reference resistors 1113b and 1114b are disposed as near as possible to the isothermal characteristics area.

The active resistor 1111a and the active resistor 1112a are disposed such that the change in the respective resistance is reverse for the two active resistors. Moreover, the active resistor 1111b and the active resistor 1112b are also disposed such that the change in the respective resistance is reverse for the two active resistors.

The fixed portions 102a and 102b are formed of a material such as silicon substrate. The movable plate 101 is formed of a material such as a thin plate of silicon which can be obtained by processing the silicon substrate. The elastic supporting layers 103a and 103b are formed by the semiconductor manufacturing process by using a thin film of silicon or a thin film of polyimide. The active resistors and the reference resistors are formed integrally by the semiconductor manufacturing process by using a material such as titanium.

A GND electrode 1100 for driving by the electrostatic-attraction force is formed on a front surface of the movable plate 101. The mirror surface 104 which is not shown in the diagram is formed on a surface opposite to the GND electrode 1100 of the movable plate 101. The mirror surface 104 is made of a material such as aluminum.

Next, the structure of the electrical wiring of the fifth embodiment will be described below. On the side of the elastic supporting portion 103a, the active resistor 1111a, 1112a are electrically connected by a wire 1135a. The reference resistors 1113a and 1114a are electrically connected by a wire 1137a. The active resistor 1111a and the reference resistor 1114a are electrically connected by a wire 1131a. The active resistor 1112a and the reference resistor 1113a are electrically connected by a wire 1133a.

Moreover, on the fixed portion 102a, electrode pads 1141a, 1142a, 1143a, and 1144a are formed. An extracted wire 1121a, which electrically connects the electrode pad 1141a and approximate middle portions of the wire 1131a, is formed. Similarly, an extracted wire 1124a, which electrically connects the electrode pad 1144a and approximate middle portions of the wire 1133a, is formed. Furthermore, an extracted wire 1122a which electrically connects the electrode pad 1142a and approximate middle portions of the wire 1137a is formed. Similarly, an extracted wire 1123a which electrically connects the electrode pad 1143a and approximate middle portions of the wire 1135a is formed.

Similarly on the side of the elastic supporting portion 103b, the active resistors 1111b and 1112b are electrically connected by a wire 1135b. The active resistors 1113b and 1114b are electrically connected by a wire 1137b. The active resistor 1111b and the reference resistor 1114b are electrically connected by a wire 1131b. The active resistor 1112b and the reference resistor 1113b are electrically connected by a wire 1133b.

Electrode pads 1141b, 1142b, and 1144b are formed on the fixed portion 102b. An extracted wire 1121b, which electrically connects the electrode pad 1141b and approximate middle portions of the wire 1131b, is formed. Similarly, a wire 1124b, which electrically connects the electrode pad 1144b and approximate middle portions of the wire 1133b, is formed. Furthermore, a wire 1122b, which electrically connects the electrode pad 1142b and approximate middle portions of the wire 1137b, is formed. A wire 1110a, which is extended from the GND electrode 1100, passes over the elastic supporting portion 103a and electrically connects the approximate middle portions of the wire 1135a. Similarly, a wire 1110b which is extended from the GND electrode 1100, passes over the elastic supporting portion 103b and electrically connects the approximate middle portion of the wire 1135b. The wires, extracted wire, electrode pads, and GND electrodes are manufactured by a semiconductor manufacturing process by using a material such as aluminum.

In the fifth embodiment, as described above, when the electrostatic driving is used, a wire from a GND electrode from drive and a wire from a resistor element can be combined into one wire. Accordingly, it is possible to reduce the number of wires in the wiring on the elastic supporting portion. The elastic supporting portion and the movable plate may be formed of a material such as polysilicon, silicon nitride, an organic material, and a metallic material, apart from silicon and polyimide. The wires, extracted wires, vertical wires, electrode pads may also be formed of a material such as copper, gold, apart from aluminum. Moreover, for the active resistors and reference registers, apart from titanium, a metallic strain-gauge of a material such as Cu—Ni and a semiconductor strain-gauge in which a material such as silicon and polysilicon is used, can be used. It is desirable to use a material which has a high gauge factor. This further improves the sensitivity of detection. A mirror surface, apart from aluminum, may be formed of a material such as gold. It is desirable to use a material having even higher reflectance.

In the embodiments from the first embodiment to fifth embodiment, a case of one optical deflector is described. However, a structure in which a plurality of optical deflectors is disposed to form an array may also be used. Thus, the present invention can have various modified embodiments which fairly fall within the basic teachings herein set forth.

Thus, as described above, the optical deflector of the present invention is in particular useful in an optical deflector which includes an angular-displacement detecting portion.

What is claimed is:

1. An optical deflector comprising:
   a movable plate;
   a fixed portion which is disposed on an outer side of the movable plate;
   an elastic supporting member which is disposed such that the elastic supporting member is substantially symmetric about a center line of the movable plate, and which connects the movable plate and the fixed portion; and
   an angular-displacement detecting portion which has a Wheatston bridge including a plurality of resistor elements, as a measuring portion, and which detects an angular displacement of the movable plate, wherein
   at least one resistor element is provided on the elastic supporting member, and
   all the resistor elements are in an isothermal characteristics area which is an area in which all the resistor elements are at approximately the same temperature condition, and the isothermal characteristics area is near a portion which connects the elastic supporting member and the fixed portion.

2. The optical deflector according to claim 1, wherein the resistor elements have the same layer structure.

3. The optical deflector according to claim 1, wherein the resistor element includes a reference element which is provided on the fixed portion and an active element which is provided on the elastic supporting member and whose resistance changes according to a distortion of the elastic supporting member, and
   the reference element and the active element have the same layer structure.

4. The optical deflector according to claim 3, wherein the fixed portion includes a substrate and a layer which are extended from the elastic supporting member, and
   the reference element is disposed only in an area of a layer which is extended.

5. The optical deflector according to claim 4, wherein there are two active elements, and
   one of the two active elements is disposed at a position where the active element is subjected to the compressive stress, and the other active element is disposed at a position where the active element is subjected to the tensile stress.

6. The optical deflector according to claim 5, wherein the reference element and the active element are formed on the same surface.

7. The optical deflector according to claim 4, wherein the reference element and the active element are formed on the same surface.

8. The optical deflector according to claim 3, wherein there are two active elements, and
   one of the two active elements is disposed at a position where the active element is subjected to the compressive stress, and the other active element is disposed at a position where the active element is subjected to the tensile stress.

9. The optical deflector according to claim 8, wherein the reference element and the active element are formed on the same surface.

10. The optical deflector according to claim 3, wherein the reference element and the active element are formed on the same surface.

11. An optical deflector comprising:
    a movable plate;
    a fixed portion which is disposed on an outer side of the movable plate;
    an elastic supporting member which is disposed such that the elastic supporting member is substantially symmetric about a center line of the movable plate, and which connects the movable plate and the fixed portion; and
    an angular-displacement detecting portion which has a Wheatston bridge including a plurality of resistor elements, as a measuring portion, and which detects an angular displacement of the movable plate, and
    all the resistor elements are in an isothermal characteristics area which is an area in which all the resistor elements are at approximately the same temperature condition,
    wherein the resistor elements include four resistor elements which are formed on the elastic supporting member, wherein
    a first resistor element and a second resistor element are formed on a same first surface;
    a third resistor element and a fourth resistor element are formed on a same second surface;
    with an angular displacement of the movable plate, one of the first resistor element and the second resistor element is disposed at a position where the resistor element is subjected to a compressive stress, and the other resistor element is disposed at a position where the resistor element is subjected to a tensile stress, and
    with the angular displacement of the movable plate, one of the third resistor element and the fourth resistor element is disposed at a position where the resistor element is subjected to the compressive stress, and the other resistor element is disposed at a position where the resistor element is subjected to the tensile stress.

12. An optical deflector comprising:
    a movable plate;
    a fixed portion which is disposed on an outer side of the movable plate;
    an elastic supporting member which is disposed such that the elastic supporting member is substantially symmetric about a center line of the movable plate, and which connects the movable plate and the fixed portion; and
    an angular-displacement detecting portion which has a Wheatston bridge including a plurality of resistor elements, as a measuring portion, and which detects an angular displacement of the movable plate, and
    all the resistor elements are in an isothermal characteristics area which is an area in which all the resistor elements are at approximately the same temperature condition, wherein
    the resistor elements include a reference element which is provided on the fixed portion, and an active element which is provided on the elastic supporting member and whose resistance changes according to a distortion of the elastic supporting member, and
    the reference element and the active element have the same layer structure.

13. The optical deflector according to claim 12, wherein the fixed portion includes a substrate and a layer which are extended from the elastic supporting member, and
    the reference element is disposed only in an area of a layer which is extended.

14. The optical deflector according to claim 13, wherein there are two active elements, and
    one of the two active elements is disposed at a position where the active element is subjected to the compressive stress, and the other active clement is disposed at a position where the active element is subjected to the tensile stress.

15. The optical deflector according to claim 14, wherein the reference element and the active element are formed on the same surface.

16. The optical deflector according to claim 13, wherein the reference element and the active element are formed on the same surface.

17. The optical deflector according to claim 12, wherein there are two active elements, and
one of the two elements is disposed at a position where the active element is subjected to the compressive stress, and the other active element is disposed at a position where the active element is subjected to the tensile stress.

18. The optical deflector according to claim 17, wherein the reference element and the active element are formed on the same surface.

19. The optical deflector according to claim 12, wherein the reference element and the active element are formed on the same surface.

20. The optical deflector according to claim 1, further comprising:
a GND electrode which is provided on the movable plate; and
a drive electrode which is provided facing the GND electrode, wherein one end of the resistor element and the GND electrode are electrically connected.

21. An optical deflector comprising:
a movable plate;
a fixed portion which is disposed on an outer side of the movable plate;
an elastic supporting member which is disposed such that the elastic supporting member is substantially symmetric about a center line of the movable plate, and which connects the movable plate and the fixed portion; and
an angular-displacement detecting portion which has a Wheatston bridge including a plurality of resistor elements, as a measuring portion, and which detects an angular displacement of the movable plate, wherein
all the resistor elements are in an isothermal characteristics area which is an area in which all the resistor elements are at approximately the same temperature condition, and said isothermal characteristics area is near a portion which connects the elastic supporting member and the fixed portion, and the resistor elements have the same layer structure, and
wherein the resistor elements include four resistor elements which are formed on the elastic supporting member, wherein
a first resistor element and a second resistor element are formed on a same first surface,
a third resistor element and a fourth resistor element are formed on a same second surface,
with an angular displacement of the movable plate, one of the first resistor element and the second resistor element is disposed at a position where the resistor element is subjected to a compressive stress, and the other resistor element is disposed at a position where the resistor element is subjected to a tensile stress, and
with the angular displacement of the movable plate, one of the third resistor element and the fourth resistor element is disposed at a position where the resistor element is subjected to the compressive stress, and the other resistor element is disposed at a position where the resistor element is subjected to the tensile stress.

* * * * *